Nov. 10, 1964     F. R. SHONKA     3,156,869
ELECTROMETER HAVING FLEXIBLE ELECTRODES AND FLEXIBLE FIBER
Filed March 19, 1962
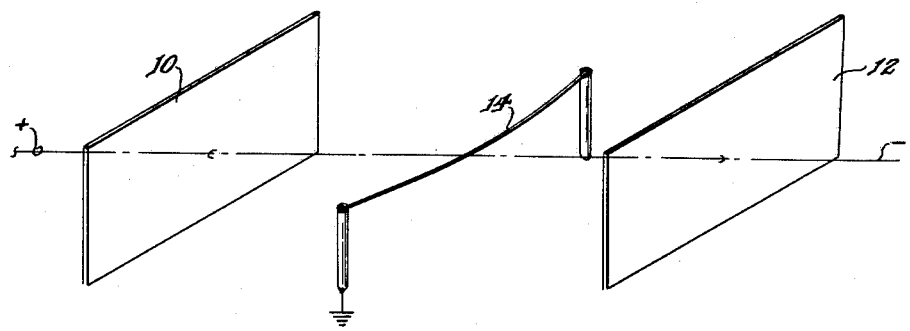
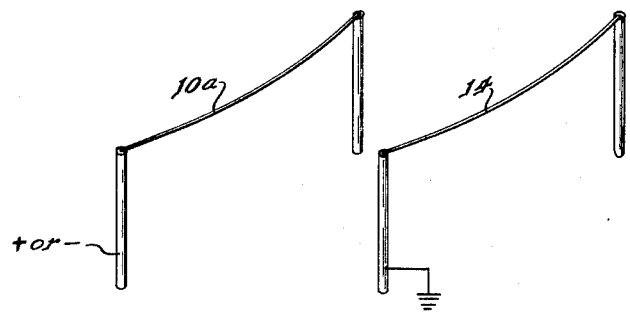
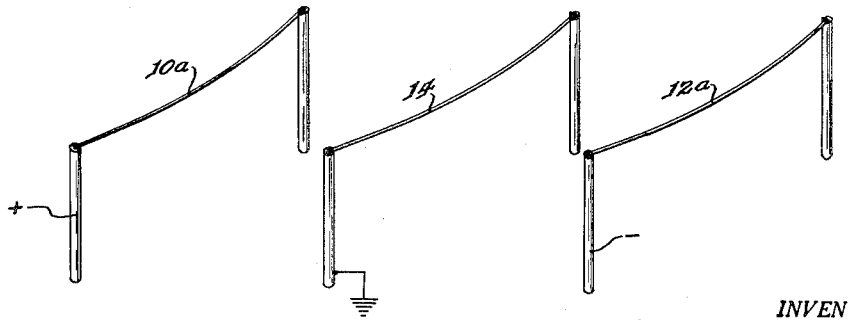
INVENTOR.
Francis R. Shonka
BY
Attorney

United States Patent Office 3,156,869
Patented Nov. 10, 1964

3,156,869
ELECTROMETER HAVING FLEXIBLE ELECTRODES AND FLEXIBLE FIBER
Francis R. Shonka, Riverside, Ill., assignor to the United States of America as represented by the United States Atomic Energy Commission
Filed Mar. 19, 1962, Ser. No. 180,910
4 Claims. (Cl. 324—109)

This invention relates to electrometers and more specifically to an improvement in the electrodes therefor and their method of mounting.

The quartz fiber electrometer used for measuring small quantities of electrical charge comprises an electrically conducting flexible element (usually a quartz fiber) and one or more rigid deflecting electrodes to which the fiber is attracted. Unless the fiber is carefully balanced, it will show geotropic effects, that is, its position will change when the instrument is tilted in any direction due in part to the weight of the fiber itself. Thus, when the instrument is tilted, the fiber will be subject to mechanical geotropism due to its own weight. Further, the mechanical geotropic effect will result in an electrical geotropic effect on the fiber since the fiber will be placed, due to its mechanical movement, in an unbalanced electrostatic field thereby giving rise to a further change in its position. The electrical geotropic effect may be several times that due to mechanical geotropism.

Three techniques are generally used for fastening fibers in an electrometer. The first comprises using cements which set at room temperature or require elevated setting temperatures. The second comprises embedding the fiber in solder. In both of these methods, the usual technique is to place the fiber on a mount which may or may not be coated with the material which is to embed the fiber. If heat is required to apply the embedding material, it is usually furnished with a flame microtorch or a small soldering iron. In some of these cases, the material which embeds the fiber does not properly wet the fiber, the mechanical clamp being effected by the material shrinking around the fiber.

A third technique comprises cutting a groove in metal wherein the fiber is placed. The groove is swaged or pressed so that it closes and clamps the fiber therein.

The main disadvantages to the above described techniques are that they do not always result in a firm clamp of the fiber. Where both ends of the fiber are to be mounted or a plurality of fibers are to be mounted, each end must be embedded individually. Since the fiber is very thin, the individual mounting process therefor is difficult.

It is therefore one object of the present invention to provide means for counteracting the electrical geotropic effect on the flexible fiber of an electrometer.

It is another object of the present invention to provide means for counteracting the mechanical geotropic effect on the flexible fiber of an electrometer.

It is another object of the present invention to provide means for counteracting any geotropic effect on the flexible fiber of an electrometer.

It is another object of the present invention to provide an improved method of mounting fibers for an electrometer.

It is still another object of the present invention to provide a method of simultaneously mounting a plurality of fibers for an electrometer.

In general, the present invention comprises replacing the rigid deflecting electrodes with flexible deflecting electrodes having a sag equal to or greater than that of the movable fiber. The flexible electrodes and movable fiber are wound on a frame parallel to each other. The frame is placed over a plastic bridge mount so that the electrodes and the fiber are in pressure contact with the mount and a blast of hot air is directed on the surface of the mount in contact with the electrodes and fiber. The surface of the mount is caused to melt, thereby allowing the electrodes and the fiber to sink and be embedded therein in a single operation.

More complete understanding of the invention will best be obtained from consideration of the accompanying drawings in which:

FIGURE 1 illustrates the electrode arrangement for a conventional binant electrometer.

FIGURE 2 illustrates an electrode arrangement for the present invention.

FIGURE 3 illustrates the electrode arrangement in a binant electrometer system for the present invention.

Reference is made to FIGURE 1 wherein is illustrated two rigid deflecting electrodes 10 and 12 and a flexible fiber 14 of a conventional binant electrometer. The fiber 14, since it is not weightless, will exhibit geotropism, that is, respond to gravitational attraction.

If the electrometer is tilted so that the fiber 14 is deflected toward one or the other rigid electrodes 10 and 12 but no electrical forces are present, the geotropism is purely mechanical. If, however, electrical forces are present, the reduction of distance between one of the electrodes 10 and 12 and fiber 14 results in an increase in the electrical force of attraction resulting in an even greater deflection. Thus, in the presence of electrical fields, the total geotropic effect may be many times greater than the purely mechanical geotropic effect. Though the foregoing explanation is directed to a binant system, it is to be understood that it is the same whether there is a single deflecting electrode or a quadrant system.

FIGURES 2 and 3 illustrate the teachings of the present invention for a single deflecting system and a binant system respectively. In FIGURE 2, the system comprises a flexible deflecting electrode 10a and a flexible fiber 14. In FIGURE 3, the system comprises two flexible deflecting electrodes 10a and 12a and a flexible fiber 14. For purposes of clarity, the explanation of the present invention will be limited to the binant system of FIGURE 3, though it is to be understood it is equally applicable to the single deflecting electrode of FIGURE 2 and a quadrant system (not shown).

It is readily apparent that the difference between the binant system of FIGURE 1 and FIGURE 3 is the replacement of rigid deflecting electrodes 10 and 12 by flexible deflecting electrodes 10a and 12a. The electrodes 10a and 12a are mounted similar to the flexible fiber 14 and parallel thereto. In operation, unlike the system of FIGURE 1, any of the electrodes 10a and 12a or the flexible fiber 14 may be observed, though generally, the fiber 14 is observed.

To compensate for the electrical geotropic effect in the electrometer of FIGURE 3, the flexible deflecting electrodes 10a and 12a are constructed so that they are identical to the fiber 14. Thus, the sag of the deflecting electrodes 10a and 12a is equal to that of the fiber 14. With this type of construction, the spacing between the deflecting electrodes 10a and 12a and fiber 14 will remain constant as the electrometer is tilted. Thus, since the spacing remains constant, the only geotropism exhibited by the instrument will be that of mechanical geotropism.

To compensate for both the mechanical and electrical geotropic effect in the electrometer of FIGURE 3, the flexible deflecting electrodes 10a and 12a are constructed so that they are more sensitive to mechanical geotropism than the fiber 14, that is, they have a greater sag. Thus, as the electrometer is tilted, the greater sag of the deflecting electrodes 10a and 12a causes a change in the distance of the fiber 14 thereto and the electrical forces on the electrodes 10a and 12a cause a motion of the fiber 14 opposite to the mechanical geotropism. Thus, the sag of deflecting electrodes 10a and 12a is chosen so that the pure mechanical geotropism of the fiber 14 and the motion thereof in the opposite direction thereto due to changes in the electrical forces will counteract each other, leaving a net geotropic deflection on the fiber 14 of zero.

It is to be noted that an increase in sensitivity for measuring change results from using the above described techniques. When a signal is applied to the instrument, mutual attraction between electrodes 10a and 12a cause them to move. The resulting changes in distance between electrodes 10a and 12a in turn cause an increase in deflection of the fiber 14. This effect occurs whether the binant system as illustrated is used or a single deflecting electrode or quadrant system is used.

Persons skilled in the art will, of course, readily adapt the teachings of the present invention to embodiments and methods far different than those illustrated. Accordingly, the scope of the protection afforded the invention should not be limited to the particular embodiments and methods thereof shown in the drawings and described above but shall be determined only in accordance with the appended claims.

What is claimed is:

1. In an electrometer having a flexible fiber with a sag therein, the combination of said flexible fiber and a flexible deflecting electrode mounted parallel and adjacent to said flexible fiber and having a sag equal to that of said flexible fiber, whereby the electrical geotropic effects on said flexible fiber are counteracted.

2. In an electrometer having a flexible fiber with a sag therein, the combination of said flexible fiber and a flexible deflecting electrode mounted parallel and adjacent to said flexible fiber and having a sag greater than said flexible fiber, whereby the electrical and mechanical geotropic effects on said flexible fiber are countered.

3. In an electrometer having a flexible fiber with a sag therein, the combination of said flexible fiber and a plurality of flexible deflecting electrodes mounted parallel to each other and to said flexible fiber, each of said plurality of deflecting electrodes having a sag equal to that of said flexible fiber, whereby the electrical geotropic effects on said flexible fiber are counteracted.

4. In an electrometer having a flexible fiber with a sag therein, the combination of said flexible fiber and a plurality of flexible deflecting electrodes mounted parallel to each other and to said flexible fiber, each of said plurality of deflecting electrodes having a sag greater than that of said flexible fiber, whereby the electrical and mechanical geotropic effects on said flexible fiber are counteracted.

References Cited in the file of this patent

UNITED STATES PATENTS

| | | |
|---|---|---|
| 2,659,865 | Rich | Nov. 17, 1953 |
| 2,794,955 | Rich | June 4, 1957 |
| 2,847,644 | Shonka et al. | Aug. 12, 1958 |
| 3,031,737 | Conley | May 1, 1962 |
| 3,081,526 | Donnell | Mar. 19, 1963 |